Oct. 17, 1950  F. E. FREY  2,525,889
PREPARATION OF HIGHER FATTY ACIDS
Filed July 14, 1947
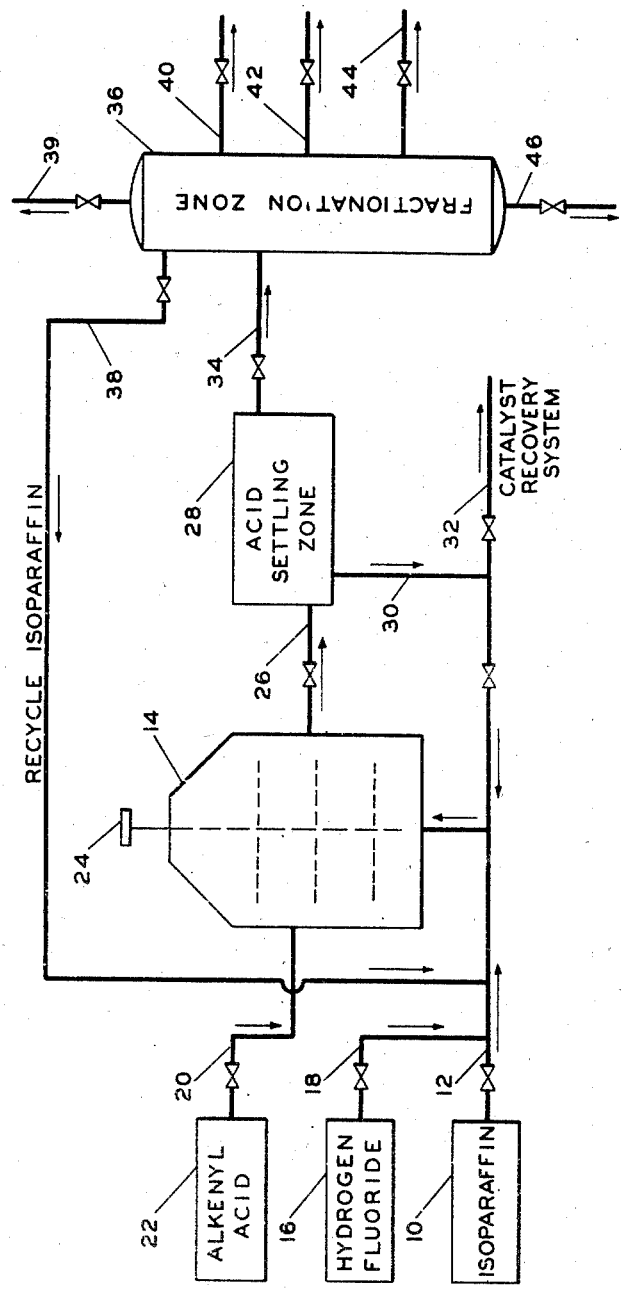
INVENTOR.
F.E. FREY
BY Hudson and Young
ATTORNEYS Patented Oct. 17, 1950

2,525,889

UNITED STATES PATENT OFFICE 2,525,889

PREPARATION OF HIGHER FATTY ACIDS

Frederick Ernest Frey, Bartlesville, Okla., assignor to Phillips Petroleum Company, a corporation of Delaware Application July 14, 1947, Serial No. 760,751

4 Claims. (Cl. 260—413)

This invention relates to a method for the preparation of alkanoic acids. One embodiment of this invention relates to the preparation of saturated alkanoic acids by catalytic inter-reaction of isoparaffins with alkenyl carboxylic acids. Another embodiment of this invention relates to a method for the conversion of unsaturated aliphatic carboxylic acids into saturated aliphatic carboxylic acids having the same number of carbon atoms. In one specific embodiment of this invention it relates to the alkylation of isobutane with oleic acid catalytically to produce stearic acid and branched-chain docosanoic acids.

Reaction of a wide variety of compounds using a great many different reactants has been carried out in the presence of hydrofluoric acid and related catalysts. The present invention differs from previous art on this subject in the use of an olefinic carboxylic acid as a reactant. It has long been known that an olefinic acid may be converted, by hydrogenation, to the corresponding saturated organic acid. It is known in the prior art to interact an isoparaffinic hydrocarbon with an unsaturated aliphatic carboxylic acid in the presence of a catalyst of the Friedel-Crafts type. In said prior art process there is employed as catalyst a metal halide, for example aluminum chloride, the reaction in the presence of the catalyst being accelerated by the presence of minor amounts of hydrogen halides. I have now found that I can convert alkenyl carboxylic acids under certain conditions and in the presence of isoparaffins into both the corresponding saturated organic acids and saturated organic acids having a greater number of carbon atoms to the molecule, employing hydrogen fluoride as catalyst without employing any metal halide or even other hydrogen halide.

One object of this invention is to provide a method for the production of alkanoic acids.

Another object of this invention is to provide a process for reacting isoparaffins with unsaturated aliphatic carboxylic acids using hydrofluoric acid as a catalyst.

Still another object is to convert unsaturated aliphatic carboxylic acids into saturated aliphatic carboxylic acids having the same number of carbon atoms.

A specific object of this invention is to react isobutane with oleic acid using substantially anhydrous hydrogen fluoride as a catalyst.

Other objects and advantages will become apparent to those skilled in the art from the accompanying discussion and description.

This invention is concerned with a process for reacting isoparaffinic hydrocarbons to produce saturated alkyl mono-carboxylic acids. The reaction is effected by reacting the isoparaffins, such as isobutane, with an alkenyl carboxylic acid, such as oleic acid, and the like, having at least ten and not more than twenty carbon atoms per molecule, in the presence of substantially anhydrous hydrofluoric acid.

A further understanding of this invention will be had by referring to the accompanying diagrammatic drawing. Referring to the drawing, an isoparaffin, such as isobutane, is passed from storage 10 through line 12 to reactor 14. The hydrogen fluoride catalyst is drawn from storage 16 through line 18 and joins line 12 where it is mixed with the isobutane prior to entering reaction zone 14. An alkenyl acid such as oleic acid, is passed through line 20 from storage 22 to reactor 14 where the interaction between the isoparaffin and the alkenyl acid takes place. The reactants and catalyst in reactor 14 are mixed by any suitable means such as, for example, by mechanical stirrer 24. The effluent from reactor 14 passes through line 26 to acid settling zone 28 where said effluent is separated into a catalyst phase and an organic material phase. The catalyst phase is withdrawn through line 30 and at least a portion of said catalyst phase is recycled to reactor 14. A portion of said catalyst phase is withdrawn through line 32 and passed to a catalyst recovery system where the hydrogen fluoride is recovered and returned to the system if desired. The organic material phase is passed from acid settling zone 28 through line 34 to fractionation zone 36 where said organic material is separated into desired fractions, for example unreacted isoparaffin is removed through line 38 and recycled to the process. Some unreacted isoparaffins and lighter material, if any, may be removed from the system through line 39. The intermediate hydrocarbon material is removed through line 40; the low-boiling alkyl carboxylic acids are removed through line 42; the high boiling alkyl carboxylic acids are removed through line 44, and the heavy bottoms are removed through line 46.

In the above-mentioned drawing reference to certain equipment such as pumps, gauges, and the like, which obviously would be necessary to actually operate the process have been intentionally omitted. Only sufficient equipment has been shown to illustrate the process and it is intended that no undue limitation be read into this invention by reference to the drawing and discussion thereof.

In one specific embodiment of this invention, isobutane is contacted with oleic acid under reaction conditions in the presence of hydrofluoric acid. The conditions in the reaction zone may vary somewhat, but they are preferably so selected as to favor production of the desired saturated organic acids and to minimize undesirable side reactions such as polymerization; to this end, the concentration of the olefinic acid reactant should be low, so that the isoparaffin is always in excess. In general the mol ratio of isobutane to oleic acid entering the reaction zone should be between about 3:1 and about 20:1. The temperature is preferably between about 0 and about 50° C. and the pressure employed is sufficient to maintain the reactants and catalyst substantially in the liquid phase, preferably in the range of 25 to 100 pounds per square inch gauge. A reaction time between about 20 and about 100 minutes has been found to be suitable for the desired conversion. The liquid volume ratio of total organic material to hydrofluoric acid catalyst in the reaction zone is in the range of about 5:1 to about 1:1. Though these conditions have been given specifically for the reactants isobutane and oleic acid using hydrogen fluoride as a catalyst, it is understood that these conditions may change in degree and in degree only when other reactants are employed and such changes are within the scope of this invention.

Several different types of reactions seem to occur in the reaction zone. Isobutane is apparently reacted with part of the oleic acid to form branched-chain docosanoic acids, which are saturated and which have a total number of carbon atoms equal to the sum of the number of carbon atoms in isobutane and in oleic acid. Also, part of the oleic acid is converted to stearic acid, a saturated organic acid having the same number of carbon atoms as oleic acid. Furthermore, octanes are formed, possibly as a result of the transfer of hydrogen from some of the isobutane to form, as intermediates, alkylating agents, such as butenes or butyl fluorides, which subsequently alkylate isobutane.

The reaction products may be removed from the reaction zone and separated by suitable separating means, as shown in the drawing, into the following fractions: a major fraction comprising chiefly docosanoic acids, a fraction comprising stearic acid, and a minor fraction comprising octanes.

Although the chemistry of the process of this invention is incompletely understood, some of the reactions that take place may be exemplified by the following equations:

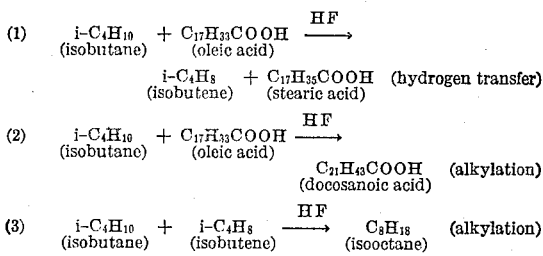

The data in the following example, however, indicate that stearic and docosanoic acids and isooctane are not necessarily the only products formed, and the scope of the invention is, therefore, not limited to any specific hypothesis. In fact, each of the above equations may simply represent the overall effect of several consecutive reactions.

This invention provides a convenient method for hydrogenating unsaturated acids under conditions that are relatively moderate in comparison with those necessary for direct hydrogenation with hydrogen. It may therefore be of considerable advantage when applied to the commercial hydrogenation of fatty acids and of related materials.

*Example*

Isobutane was reacted with oleic acid in the presence of liquid substantially anhydrous hydrofluoric acid at room temperature (28–29° C.) in a steel reactor provided with a motor-driven stirrer. The oleic acid was added to the isobutane-HF mixture during a period of 35 minutes, after which stirring was continued for an additional 30 minutes. The overall mol ratio of isobutane to oleic acid was 5:1.

The debutanized product of the reaction was distilled under vacuum. The neutralization number (mg. of KOH required to neutralize 1 gram of sample) of the various fractions was determined, and the molecular weights corresponding to the neutralization numbers were calculated. The results are presented in the following table:

| Fraction | Boiling Range, °C. (corr. to 760 mm.) | Volume Per Cent of Debutanized Product | Neutralization Number | Mol Weight |
|---|---|---|---|---|
| 1 | <155 | 9.6 | | [1] 112.6 |
| 2 | 155–352 | 5.9 | 189 | 296 |
| 3 | 352–397 | 30.1 | 182 | 308 |
| 4 | 397–412 | 34.7 | 168 | 335 |
| 5 | >412 | 19.7 | | |

[1] Determined directly.

Fraction 1 had a specific gravity (20/4) of 0.7164 and a refractive index of 1.3983 at 20° C. and comprised mainly octanes.

Fraction 3 comprised mainly stearic acid, which has a corrected boiling point of 383° C., a neutralization number of 197 and a molecular weight of 284. The low experimental value for the neutralization number is probably a result of the presence of nonacidic compounds, probably hydrocarbons, in the fraction.

Fraction 4 comprised a mixture of branched-chain docosanoic acids, among which 9- and 10-(t-butyl) octadecanoic acids were believed to be present. The docosanoic acids have a neutralization number of 165 and a molecular weight of 340. Normal docosanoic acid, also called "behenic acid," is known to have a corrected boiling point of 418° C.

It is to be understood that this invention should not be unnecessarily limited to the above discussion and description and that modifications and variations may be made without departing substantially from the invention or from the scope of the claims.

I claim:

1. A process for the preparation of a hydrocarbon material and alkanoic acids, which comprises interacting an isoparaffin hydrocarbon with an unsaturated aliphatic carboxylic acid in the presence of substantially anhydrous hydrogen fluoride as catalyst and in the absence of any metal halide, and recovering from effluents of said reaction a saturated aliphatic carboxylic acid having the same number of carbon atoms per molecule as said unsaturated acid.

2. A process for the manufacture of hydrocarbon material and alkanoic acids, which comprises interacting an isoparaffin with an alkenyl monocarboxylic acid in a reaction zone in the presence of hydrogen fluoride catalyst; maintaining the mol ratio of said isoparaffin to said alkenyl acid entering said reaction zone in the range of about 3:1 to 20:1, maintaining the liquid volume ratio of total organic material in said reaction zone to said catalyst in the range of about 5:1 to about 1:1, maintaining the temperature in said reaction zone in the range of about 0 to about 50° C., maintaining the pressure in said reaction zone sufficient to maintain liquid phase conditions, maintaining the rate of flow through said reaction zone such that the reaction time will be in the range of about 20 to about 100 minutes, separating the effluent material from said reaction zone into a catalyst phase and an organic material phase, and recovering as a product of the process an alkanoic acid having the same number of carbon atoms per molecule as said alkenyl monocarboxylic acid.

3. A process for interacting an isoparaffin with an alkenyl monocarboxylic acid to produce substantial proportions of a hydrocarbon material and an alkyl monocarboxylic acid having the same number of carbon atoms as said alkenyl monocarboxylic acid, which comprises interacting a low-boiling isoparaffin with an alkenyl monocarboxylic acid having at least ten and not more than twenty carbon atoms per molecule in a reaction zone in the presence of hydrogen fluoride catalyst; maintaining the mol ratio of said isoparaffin to said alkenyl acid entering said reaction zone in the range of about 3:1 to 20:1, maintaining the liquid volume ratio of total organic material in said reaction zone to said catalyst in the range of about 5:1 to about 1:1, maintaining the temperature in said reaction zone in the range of about 0 to about 50° C., maintaining the pressure in said reaction zone sufficient to maintain liquid phase conditions, maintaining the rate of flow through said reaction zone such that the reaction time will be in the range of about 20 to about 100 minutes, and recovering the products of the process.

4. A process for interacting isobutane with oleic acid to produce substantial proportions of a normally liquid paraffin hydrocarbon material and stearic acid, which comprises interacting isobutane with oleic acid in a reaction zone in the presence of hydrogen fluoride catalyst; maintaining the mol ratio of said isobutane to said oleic acid entering said reaction zone in the range of about 3:1 to 20:1, maintaining the liquid volume ratio of total organic material in said reaction zone to said catalyst in the range of about 5:1 to about 1:1, maintaining the temperature in said reaction zone in the range of about 0 to about 50° C., maintaining the pressure in said reaction zone sufficient to maintain liquid phase conditions, maintaining a rate of flow through said reaction zone such that the reaction time will be in the range of about 20 to about 100 minutes, and recovering a normally liquid paraffinic hydrocarbon material and stearic acid as products of the process.

FREDERICK ERNEST FREY.

REFERENCES CITED

The following references are of record in the file of this patent:

UNITED STATES PATENTS

| Number | Name | Date |
|---|---|---|
| 2,370,494 | Schmerling | Feb. 27, 1945 |
| 2,403,501 | Clarke | July 9, 1946 |
| 2,404,393 | Mayland | July 23, 1946 |
| 2,431,715 | Wachter | Dec. 2, 1947 |